United States Patent
Harbers

(10) Patent No.: US 10,405,408 B2
(45) Date of Patent: *Sep. 3, 2019

(54) LIGHTING COMMUNICATIONS GATEWAY

(71) Applicant: Xicato, Inc., San Jose, CA (US)

(72) Inventor: Gerard Harbers, Sunnyvale, CA (US)

(73) Assignee: Xicato, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/888,817

(22) Filed: Feb. 5, 2018

(65) Prior Publication Data

US 2018/0160514 A1 Jun. 7, 2018

Related U.S. Application Data

(63) Continuation of application No. 15/157,286, filed on May 17, 2016, now Pat. No. 10,009,980.

(Continued)

(51) Int. Cl.
*H04W 12/06* (2009.01)
*H05B 37/02* (2006.01)
(Continued)

(52) U.S. Cl.
CPC ....... *H05B 37/0272* (2013.01); *H04L 12/282* (2013.01); *H04L 12/283* (2013.01);
(Continued)

(58) Field of Classification Search
CPC ............ H05B 33/0845; H05B 37/0272; H05B 37/0227; H04W 4/008; H04W 12/06;
(Continued)

(56) References Cited

U.S. PATENT DOCUMENTS 5,959,316 A 9/1999 Lowery
6,181,086 B1 1/2001 Katyl et al.
(Continued)

FOREIGN PATENT DOCUMENTS

EP 2560463 A2 2/2013
WO WO-2007/036886 A2 4/2007
(Continued)

*Primary Examiner* — Thanh C Le
(74) *Attorney, Agent, or Firm* — Silicon Valley Patent Group LLP

(57) ABSTRACT

An LED based illumination device includes an and a LED based light engine and a light control and communications gateway (LCCG). An LED driver in the LCCG receives receives a light control command via a lighting control network interface and in response provides an an electrical current that controls the amount of light produced by the LED based light engine. The lighting control network interface of the LCCG is communicatively coupled to a lighting control network. The LCCG additionally includes a building management network interface that is communicatively coupled to a building management network. Identification and operational data for a plurality of LED based illumination devices communicatively coupled to the lighting control network is stored in memory, and operational data is communicated from the LCCG over the building management network interface to a building management system communicately coupled to the LCCG over the building management network.

20 Claims, 8 Drawing Sheets

Related U.S. Application Data

(60) Provisional application No. 62/163,281, filed on May 18, 2015.

(51) Int. Cl.
*H04L 12/28* (2006.01)
*H05B 33/08* (2006.01)
*H04W 4/80* (2018.01)
*H04W 84/12* (2009.01)
*H04W 88/16* (2009.01)

(52) U.S. Cl.
CPC ...... *H04L 12/2809* (2013.01); *H04L 12/2823* (2013.01); *H04L 12/2834* (2013.01); *H04W 4/80* (2018.02); *H04W 12/06* (2013.01); *H05B 33/0845* (2013.01); *G08C 2201/93* (2013.01); *H04L 2012/285* (2013.01); *H04L 2012/2843* (2013.01); *H04W 84/12* (2013.01); *H04W 88/16* (2013.01)

(58) Field of Classification Search
CPC .. H04W 84/12; H04W 88/16; H04L 12/2809; H04L 12/282; H04L 12/2823; H04L 12/283; G08C 2201/93
See application file for complete search history.

(56) References Cited

U.S. PATENT DOCUMENTS

| | | | |
|---|---|---|---|
| 6,331,756 B1 | 12/2001 | Belliveau | |
| 6,351,069 B1 | 2/2002 | Lowery et al. | |
| 6,504,301 B1 | 1/2003 | Lowery | |
| 6,586,882 B1 | 7/2003 | Harbers | |
| 6,600,175 B1 | 7/2003 | Baretz et al. | |
| 6,680,569 B2 | 1/2004 | Mueller-Mach et al. | |
| 6,812,500 B2 | 11/2004 | Reeh et al. | |
| 7,126,162 B2 | 10/2006 | Reeh et al. | |
| 7,250,715 B2 | 7/2007 | Mueller et al. | |
| 7,479,662 B2 | 1/2009 | Soules et al. | |
| 7,564,180 B2 | 7/2009 | Brandes | |
| 7,614,759 B2 | 11/2009 | Negley | |
| 7,629,621 B2 | 12/2009 | Reeh et al. | |
| 8,952,626 B2 | 2/2015 | Huang et al. | |
| 9,591,726 B2 | 3/2017 | Harbers | |
| 9,596,737 B2 | 3/2017 | Harbers | |
| 10,111,308 B2 * | 10/2018 | Huizenga | H05B 37/0272 |
| 2006/0256907 A1 | 11/2006 | Stalker et al. | |
| 2007/0081336 A1 | 4/2007 | Bierhuizen et al. | |
| 2007/0293208 A1 | 12/2007 | Loh et al. | |
| 2008/0265799 A1 | 10/2008 | Sibert | |
| 2009/0150004 A1 | 6/2009 | Wang et al. | |
| 2009/0267540 A1 | 10/2009 | Chetnel et al. | |
| 2010/0029268 A1 | 2/2010 | Myer | |
| 2011/0001436 A1 | 1/2011 | Chemel et al. | |
| 2012/0040606 A1 | 2/2012 | Verfuerth | |
| 2013/0119894 A1 | 5/2013 | Yeh et al. | |
| 2013/0346229 A1 | 12/2013 | Martin et al. | |
| 2014/0265879 A1 | 9/2014 | Dillen | |
| 2015/0130368 A1 | 5/2015 | Harbers | |
| 2017/0105271 A1 * | 4/2017 | Ramer | H05B 37/0227 |
| 2017/0150583 A1 | 5/2017 | Harbers | |
| 2017/0164453 A1 | 6/2017 | Harbers et al. | |

FOREIGN PATENT DOCUMENTS

| | | |
|---|---|---|
| WO | WO 2013/057646 A1 | 4/2013 |
| WO | WO-2015/002895 A1 | 1/2015 |
| WO | WO 2015/112637 | 1/2015 |
| WO | WO2016/187334 | 11/2016 |

* cited by examiner

LIGHTING COMMUNICATIONS GATEWAY

CROSS REFERENCE TO RELATED APPLICATIONS

This application is a continuation of U.S. Non-Provisional application Ser. No. 15/157,286, filed May 17, 2016, which claims priority under 35 USC 119 to U.S. Provisional Application No. 62/163,281, filed May 18, 2015, which is incorporated by reference herein in its entirety.

TECHNICAL FIELD

The described embodiments relate to illumination modules that include Light Emitting Diodes (LEDs).

BACKGROUND

The use of LEDs in general lighting is becoming more desirable and prevalent. Typically, LED illumination devices are standalone units. It is desirable, however, to be able to communicate between devices and with external devices.

SUMMARY

An LED based illumination device includes an and a LED based light engine and a light control and communications gateway (LCCG). An LED driver in the LCCG receives receives a light control command via a lighting control network interface and in response provides an an electrical current that controls the amount of light produced by the LED based light engine. The lighting control network interface of the LCCG is communicatively coupled to a lighting control network. The LCCG additionally includes a building management network interface that is communicatively coupled to a building management network. Identification and operational data for a plurality of LED based illumination devices communicatively coupled to the lighting control network is stored in memory, and operational data is communicated from the LCCG over the building management network interface to a building management system communicately coupled to the LCCG over the building management network.

In one embodiment, an LED based illumination device includes an LED based light engine configured to emit an amount of light in response to an electrical current received by the LED based light engine; a light control and communications gateway (LCCG) electrically coupled to the LED based light engine, the LCCG comprising: an LED driver configured to receive an amount of electrical power and a light control command and generate the electrical current in response to the light control command; a lighting control network interface communicatively coupled to a lighting control network, wherein the light control command is received on the lighting control network interface; a building management network interface communicatively coupled to a building management network; and a memory configured to store identification data and operational data associated with a plurality of LED based illumination devices communicatively coupled to the lighting control network, wherein at least a portion of the operational data is communicated from the LCCG over the building management network interface to a building management system communicately coupled to the LCCG over the building management network.

In one embodiment, a light control and communications gateway includes one or more processors; a first radio frequency transceiver configured to receive a first communication signal from a LED based illumination device over a lighting control network, the first communication signal including an indication of an operational status of the LED based illumination device; and a non-transitory, computer readable medium storing instructions that when executed by the one or more processors cause the one or more processors to: receive the indication of the operational status of the LED based illumination device; determine a summary status value associated with the LED based illumination device based on the operational status of the LED based illumination device; and communicate the summary status value to a building management system over a building management network.

In one embodiment, a light control and communications gateway includes a radio frequency transceiver configured as a lighting control network interface communicatively coupled to a lighting control network and a building management network interface communicatively coupled to a building management network, the radio frequency transceiver further configured to receive a first communication signal from a mobile electronics device, the first communications signal indicating a request to join the lighting control network; and a computing system configured to: receive the indication of the request to join the lighting control network from the mobile electronics device; communicate a request to a building management system to authenticate the mobile electronics device over the building management network; receive an indication from the building management system that the mobile electronics device is allowed to join the lighting control network; and communicate an indication to the mobile electronic device that the mobile electronic device is allowed to access the lighting control network.

DETAILED DESCRIPTION

Reference will now be made in detail to background examples and some embodiments of the invention, examples of which are illustrated in the accompanying drawings.

Figure 1:
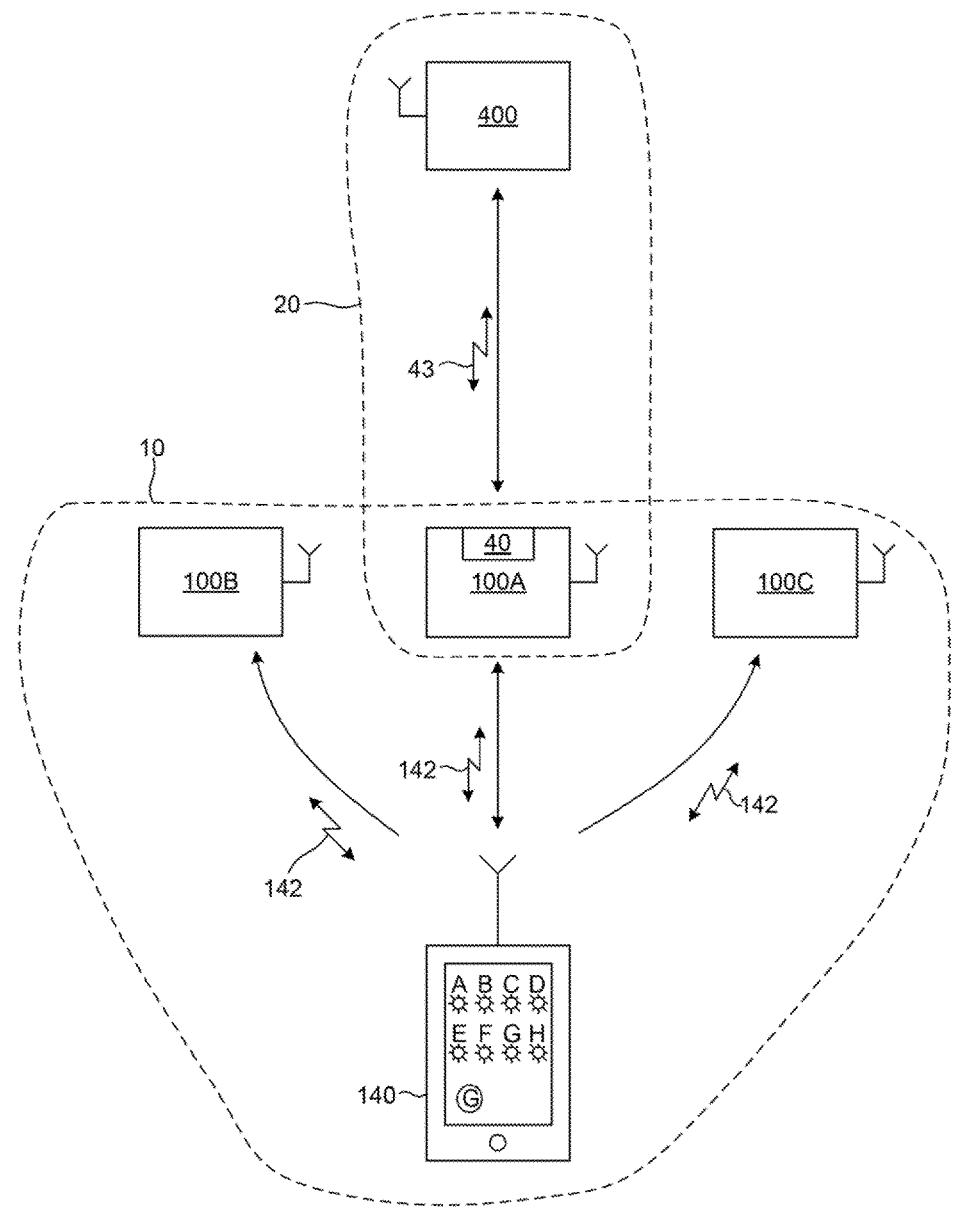
FIG. 1 depicts a lighting control and information system including a lighting control network and a building management network.

FIG. 1 depicts a lighting control and information system including a lighting control network 10 and a building management network 20 in an exemplary, non-limiting embodiment. Lighting control network 10 is configured as a wireless network (e.g., Bluetooth protocols commonly referred to as Bluetooth Smart, Bluetooth LE, etc.). Lighting control network 10 includes LED based illumination devices 100A-C and a lighting control device such as a mobile electronics device 140 (e.g., mobile phone, tablet computer, etc.). Lighting control network 20 is also configured as a wireless network (e.g., 802.11, etc.) that includes building management system 400 and LED based illumination device 100A. In one aspect, LED based illumination device 100A includes a Lighting Control and Communications Gateway (LCCG) 40 configured as a communications bridge between lighting control network 10 and building management network 20.

Figure 2:
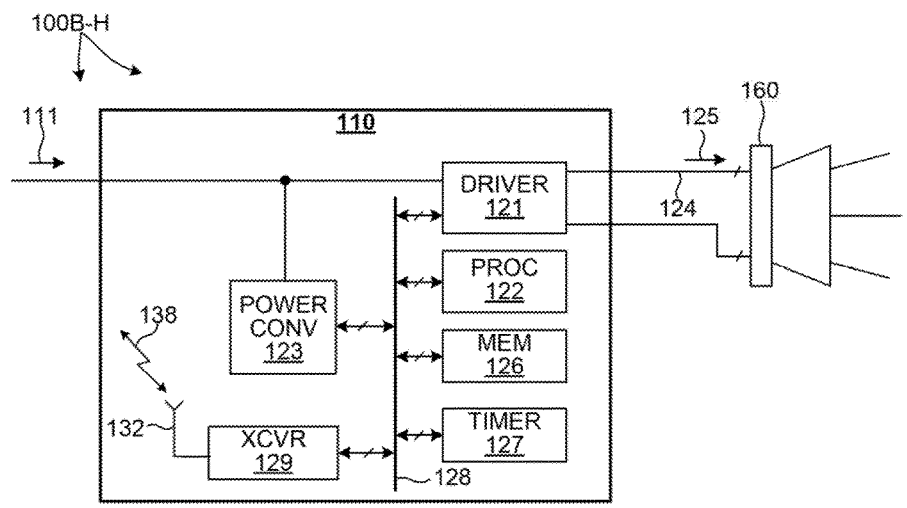
FIG. 2 depicts an exemplary LED based illumination device that includes a Light Control and Data Interface Module (LCDIM) configured to supply electrical power to an LED based light engine and a radio frequency transceiver configured to communicate signals with other devices on the lighting control network.
Figure 4:
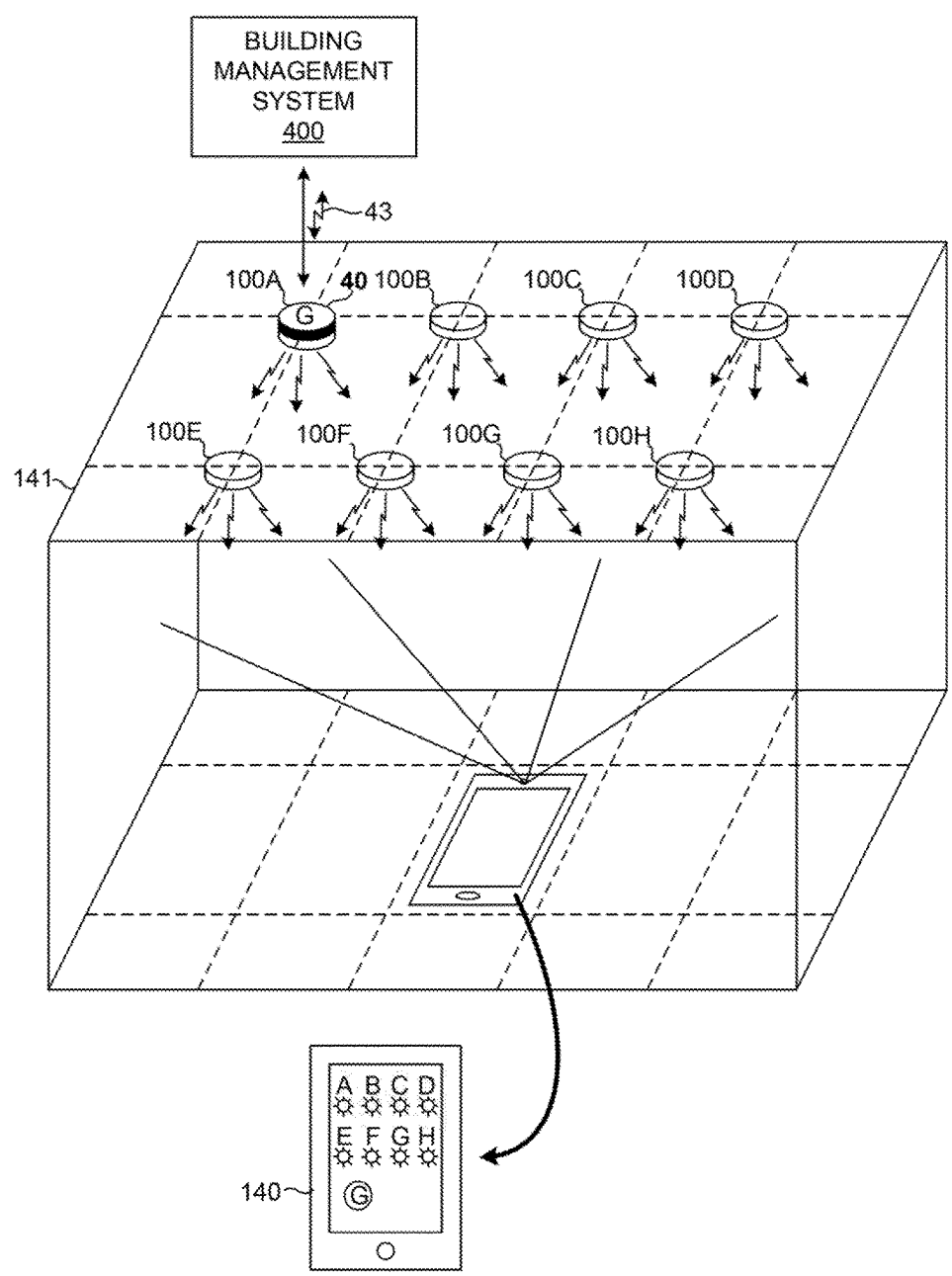
FIG. 4 depicts an environment illuminated by LED based illumination devices that include a LCDIM to bridge communications between a lighting control network and a building management network.

FIG. 2 depicts an exemplary LED based illumination device such as any of LED based illumination devices 100B-C depicted in FIG. 1 and LED based illumination devices 100B-H depicted in FIG. 4. LED based illumination device 100B-H includes a Light Control and Data Interface Module (LCDIM) 110 configured to supply electrical power to an LED based light engine 160. In addition, LCDIM 110 also integrates light control, power conversion, data acquisition, data processing, and communication capability. LCDIM 110 includes a radio frequency transceiver 129, e.g., transmitter and receiver, configured to communicate signals 138 with other devices on the lighting control network 10. In the embodiment depicted in FIG. 2, LCDIM 110 includes an LED driver 121, a power converter 123, a radio frequency transceiver 129, a processor 122, a memory 126, and a timer 127 configured to communicate over bus 128.

Figure 3:
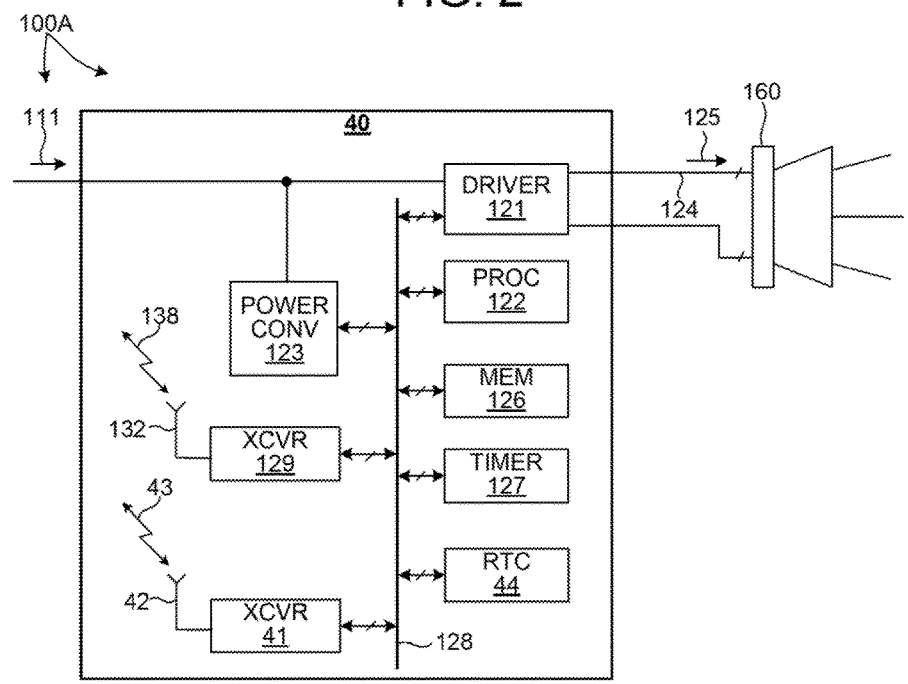
FIG. 3 depicts another exemplary LED based illumination device that includes a includes a LCDIM configured to supply electrical power to an LED based light engine, a radio frequency transceiver configured to communicate signals with other devices on the lighting control network, and another radio frequency transceiver configured to communicate signals with other devices on the building management network.

FIG. 3 depicts an exemplary LED based illumination device such as LED based illumination devices 100A depicted in FIGS. 1 and 4. LED based illumination device 100A includes LCCG 40 also configured to supply electrical power to an LED based light engine 160, and also integrates light control, power conversion, data acquisition, data processing, and communication capability. LCCG 40 also includes a radio frequency transceiver 129, e.g., transmitter and receiver, configured to communicate signals 138 with other devices on the lighting control network 10. However, in addition, in some embodiments, LCCG 40 includes an additional radio frequency transceiver 41, including a transmitter and receiver, configured to communicate signals 43 with other devices on the building management network 20 such as building management system 400. In some other embodiments, LCCG 40 does not include an additional radio frequency transceiver, rather LCCG 40 includes additional software that allows radio frequency transceiver 129 of LCCG 40 to communicate signals 43 with other devices on the building management network 20 such as building management system 400, in addition to communicating signals 138 with other devices on the lighting control network 10.

In some embodiments, the wireless communications protocol associated with the lighting control network 10 is different from the wireless communications protocol associated with the building management network 20. In one example, the wireless communications protocol associated with the lighting control network 10 is Bluetooth Smart. Such a network is localized and is compatible with many mobile electronics devices 140. A number of lighting control functions such as commissioning, configuration of groups, control parameter selection, indoor location services, etc., are coordinated by mobile electronics device 140 on the lighting control network 10. In this example, the wireless communications protocol associated with the building management network 20 is WiFi. Such a network is compatible with existing hardware associated with information technology in a building environment. A number of building management functions such as high-level light control configuration, security, firmware management, analytics, and data collection are coordinated by building management system 400 on the building management network 20.

In one example, in the lighting control network 10 depicted in FIG. 1, a mobile electronics device 140 broadcasts a signal 142 indicating a request to join the lighting control network 10. Signal 142 is broadcast wirelessly and is received by LED based illumination devices 100A, 100B, and 100C on the lighting control network 10. In response, LED based illumination device 100A broadcasts signal 43 to building management system 400 requesting authentication of mobile electronics device 140 on the building management network 20. Based on the response of building management system 400, mobile electronics device 140 is either allowed onto lighting control network 10 or denied access. In this manner, the building management system 400 control access to various lighting control networks throughout a building or series of buildings.

Figure 5:
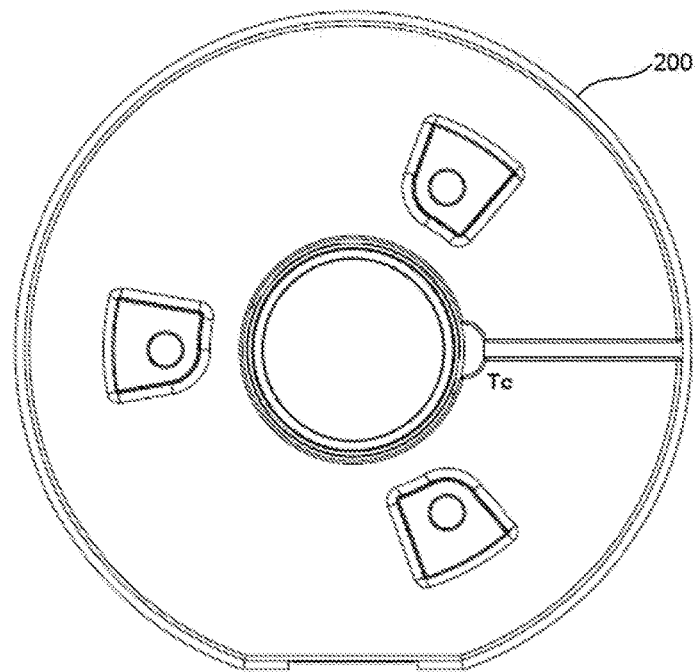
FIGS. 5 and 6 depict a top view and a side view, respectively, of an LED based illumination device including a LCDIM.
Figure 6:
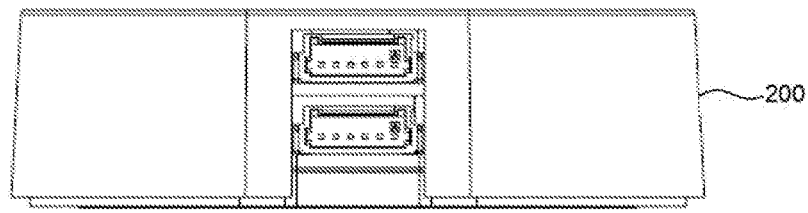

FIGS. 5 and 6 depict a top view and a side view, respectively, of an LED based illumination device 200 including a LCDIM. An example of such a lighting device is the Xicato Intelligent Module (XIM) manufactured by Xicato, Inc., San Jose, Calif. (USA).

Figure 7:
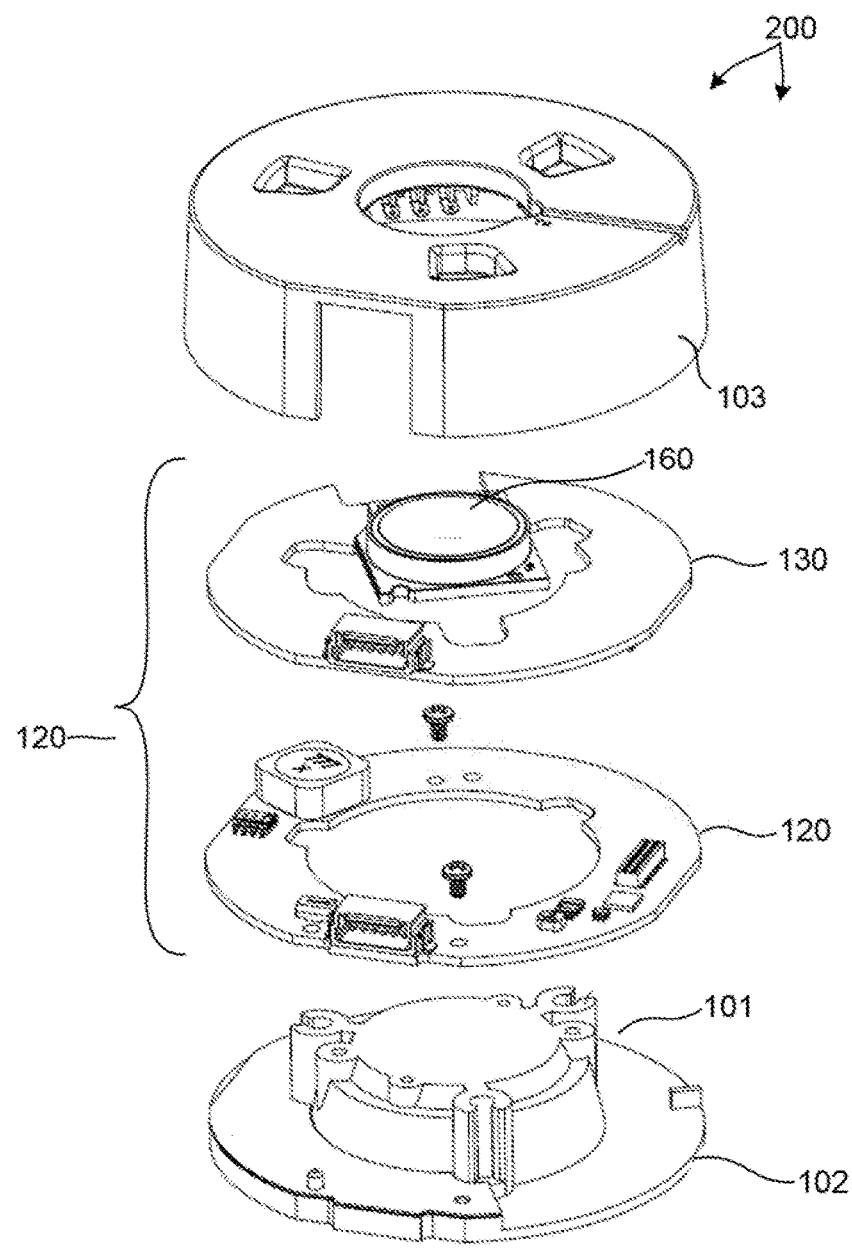
FIG. 7 depicts an exploded view illustrating components of LED based illumination device as depicted in FIG. 2.

FIG. 7 depicts an exploded view illustrating components of LED based illumination device 200 as depicted in FIG. 2. As depicted in FIG. 7, LED based illumination device 200 includes LED based light engine 160, LCDIM 110, including primary electrical circuit board (ECB) 120 and peripheral ECB 130, heat sink 101, mounting plate 102, and housing 103.

The assembled LED based illumination device 200 mechanically integrates the LED based light engine 160 with the LCDIM within a common housing. However, in general, one or more components of LED based illumination device 200 may be mechanically separated from the others. In these embodiments, one or more components may be separately located on a light fixture and electrically coupled to the other components by suitable wiring and connectors. In some embodiments, LED based light engine 160 is assembled within a simple housing to facilitate attachment to a heat sink. An example of such a lighting device is the Xicato Thin Module (XTM) manufactured by Xicato, Inc., San Jose, Calif. (USA). In this example, one or more components of LCDIM 110 are packaged in a separate housing, and this assembly is electrically coupled to the LED based light engine by a wired connection.

It should be understood that as defined herein an LED based illumination device is not an LED, but is an LED light source or fixture or component part of an LED light source or fixture. As depicted in FIGS. 5-7, LED based illumination device 200 includes an LED based light engine 160 configured to generate an amount of light. LED based light engine 160 is coupled to heat sink 101 to promote heat extraction from LED based light engine 160. Primary ECB 120 and peripheral ECB 130 are shaped to fit around heat sink 101. LED based light engine 160, primary ECB 120, peripheral ECB 130, and heat sink 101 are enclosed between mounting plate 102 of heat sink 101 and housing 103. An optional reflector retainer (not shown) is coupled to housing 103. The reflector retainer is configured to facilitate attachment of different reflectors to the LED based illumination device 200.

In some embodiments, it is advantageous to separate the electronic functionality of LCDIM 110 across two or more electrical circuit boards, as depicted in FIG. 7, to minimize logistical complexity. For example, in a network of LED based illumination devices, certain devices may include different functionality than others. Common functionality is included on the primary ECB associated with each device. In this manner each manufactured device includes the same primary ECB. However, differing functionality is included in a different peripheral ECB. In this manner, one of more different devices may include different peripheral ECBs. Many different configurations may be contemplated. In general, the electronic functionality of LCDIM 110 and LCCG 40 as described herein may be distributed across any number of components in any suitable manner.

In the embodiment depicted in FIG. 2, LED driver 121 is configured to supply power to one or more LEDs of the LED based light engine 160 over a wired connection 124 between LCDIM 110 and LED based light engine 160. In one embodiment, LED driver 121 is a direct current to direct current (DC/DC) power converter. The DC/DC power converter receives electrical power signals 111 (e.g., 48 Volt supply voltage) supplied to LCDIM 110. The electrical power signals 111 are processed by the DC/DC power converter to generate current signals 125 supplied to the LEDs of LED based light engine 160. In some other embodiments, LED driver 121 is configured as an AC/DC power converter configured to convert AC input power signals to DC current signals supplied to the LEDs of LED based light engine 160. In some other embodiments, LED driver 121 is configured as an AC/AC power converter configured to convert AC input power signals to AC current signals supplied to the LEDs of LED based light engine 160 (e.g., when LED based light engine 160 includes AC LEDs).

In another aspect, LCDIM 110 includes a power converter 123 configured to supply low voltage electrical power signals to the components of LCDIM 110. In this manner, electrical power signals 111 can be used to supply electrical power to LED driver 121 and electrical power to the low voltage components of LCDIM 110 after power conversion by power converter 123. In some embodiments, power converter 123 is a DC/DC power converter that steps down the voltage of electrical power signals 111 to a low voltage range (e.g., less than five volts) suitable for powering the electronic circuitry of LCDIM 110.

LCDIM 110 includes a wireless communications interface to a lighting control network. In some embodiments the wireless communications interface is configured to transmit and receive communications signals 138. The wireless communications interface includes a wireless transmitter and a wireless receiver, e.g., in transceiver 129, operable in accordance with a wireless communications protocol, and one or more associated antennas 132 mounted to LED based illumination device 100. Any suitable wireless communications protocol may be contemplated, (e.g., Bluetooth Smart, 802.11, Zigbee, 6LoWPAN, Z-wave, 802.15.4, DECT, cellular modem, etc.).

In some embodiments, one or more antennas are mounted to the external facing surface(s) of LED based illumination device 100 to maximize communication efficiency between LED based illumination device 100 and a remotely located communications device (e.g., another LED based illumination device, a sensor module, a mobile phone, a router, or other digital system). In some embodiments, an antenna is integrated into the peripheral ECB 130. In some other embodiments, the antenna is integrated into the primary ECB 120. In some other embodiments, the antenna is integrated into housing 103, for example, by molding the antenna into the housing structure or attaching the antenna to a surface of the housing structure. In some other embodiments, the antenna is integrated into the mounting board of the LED based light engine 160.

As depicted in FIG. 2, LCDIM 110 includes an internal communications bus 128 coupled to various components including processor 122, memory 126, timer 127, power converter 123, transceiver 129, and LED driver 121.

The methodologies described herein may be implemented with modules (e.g., procedures, software functions, and so on) that perform the functions described herein. Any machine-readable medium tangibly embodying instructions may be used in implementing the methodologies described herein. For example, software codes may be stored in memory 126 and executed by the processor 122. Memory 126 may be implemented within or external to the processor 122. The functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In a further aspect, memory 126 stores identification data, operational data such as temperature history, current history, etc. For example, an identification number, a network security key, commissioning information, etc. may be stored on memory 126.

In the embodiment depicted in FIG. 3, LCCG 40 includes like numbered elements as described hereinbefore with reference to LCDIM 110 depicted in FIG. 2. In addition, LCCG 40 includes a second wireless communications interface to a building management network. In some embodiments the wireless communications interface is configured to transmit and receive communications signals 43. In some embodiments, the wireless communications interface includes a wireless transceiver 41 operable in accordance with a wireless communications protocol, and one or more associated antennas 42 mounted to LED based illumination device 100. Any suitable wireless communications protocol may be contemplated, (e.g., Bluetooth Smart, 802.11, Zigbee, LoWPAN, Zwave, 802.15.4, DECT, cellular modem, etc.). In some other embodiments, the wireless communications interface includes wireless transceiver 129 operable in accordance with a second wireless communications protocol, and one or more associated antennas 132 mounted to LED based illumination device 100. Any suitable wireless communications protocol may be contemplated, (e.g., Bluetooth Smart, 802.11, Zigbee, LoWPAN, Zwave, 802.15.4, DECT, cellular modem, etc.). In some embodiments, the same communications protocol is employed on both the building management network and the lighting control network. In other embodiments, the communications protocol employed on the building management network is different from the communications protocol employed on the lighting control network.

In some other embodiments, the second wireless communications interface to the building management network is a wired communication interface operable in accordance with a wired communications protocol. Any suitable wired communications protocol may be contemplated, (e.g., Ethernet, DALI, Lutron Ecosystem, BACnet, LonWorks, KNX, power line communication, etc.).

In some embodiments, the communication signals of lighting control network 10 and building management network 20 are encrypted.

In some examples, LCCG 40 communicates data generated by LED based illumination devices 100A-C, and attached sensors, to the building management system 400.

In a further aspect, the amount of data communicated between LCCG 40 and building management system 400 is reduced by caching data associated with each LED based illumination device 100A-C on LCCG 40 for ready access by the building management system 400. In this manner, each request for data from the building management system 400 does not require a communication with each individual LED based illumination device to obtain the desired data. In some examples, LCCG 40 is configured to respond to a request for data by the building management system 400 based on cached data stored on LCCG 40 without having to initiate additional communications with other LED based illumination devices (e.g., LED based illumination devices 100B-C.

In some embodiments, any number of parameters associated with one or more LED based illumination devices in lighting control network 10 are communicated to LCCG 40 and stored in memory 126 of LCCG 40. Moreover, processor 122 of LCCG 40 is configured to determine summary status values associated with each LED based illumination device in lighting control network 10 based at least in part on information stored in memory 126.

By way of non-limiting example, information communicated from each LED based illumination device to LCCG 40 may include any of: a voltage supplied to one or more LEDs of the LED based illumination device, a current supplied to the one or more LEDs of the LED based illumination device, an electrical power consumed by the LED based illumination device, a temperature of the LED based illumination device, a time when the LED based illumination device transitions from an active state to an inactive state, and a time when the LED based illumination device transitions from an inactive state to an active state.

Status information communicated from each LED based illumination device to LCCG 40 is stored in memory 126 of LCCG 40 for several purposes. In one example, the status information is stored for rapid access and response to a request for status information by a building management system 400. For example, the processor 122 may be configured to receive a request for information associated with an LED based illumination device from the building management system 400. The processor 122 is configured to determine a response to the request based on data stored in the memory 126 of LCCG 40 and transmit the response to the building management system 400 over the building management network 20. For example, the temperature of LED based illumination device 100B is periodically reported to LCCG 40 over lighting control network 10 and stored in memory 126 of LCCG 40. At a point in time, a request to report the temperature of LED based illumination device 100B is received by LCCG 40 from building management system 400. In response, LCCG 40 reads out the latest temperature value stored in memory 126 and communicates this value to building management system 400 over building management network 20.

In another example, status information stored on LCCG 40 is rapidly communicated to the building management system 400 without specific request. For example, at a point in time LCCG 40 receives a shutdown flag from LED based illumination device 100B followed by an error code. The error code is stored in memory 126 of LCCG 40. However, in addition, LCCG 40 rapidly communicates the error code to building management system 400 for logging and reporting purposes. By way of non-limiting example, an error code is indicative of any of an operating temperature exceeding a threshold value, an operating voltage exceeding a threshold value, an operating voltage below a threshold value, an operating current exceeding a threshold value, an operating current below a threshold value.

In yet another example, the status information is stored on LCCG 40 for further processing to generate summary status values based on the stored status information. For example, the total amount of time that the LED based illumination device 100B has been in an active state may be computed based on the times between transitions from an inactive state to an active state and transitions from an active state to an inactive state. For example, both shutdown and restart events are reported to LCCG 40 by LED based illumination device 100B over the lighting control network 10. LCCG 40 includes a real time clock 44 and is configured to associate the current time with each of the reported shutdown and restart events and store these times in memory 126. Thus, the times associated with transitions from an inactive state to an active state and transitions from an active state to an inactive state are stored in the memory 126 of LCCG 40. At a point in time, LCCG 40 receives a request to report the total run time of LED based illumination device 100B from building management system 400. In response, processor 122 of LCCG 40 is configured to compute and report the total amount of time that the LED based illumination device 100B has been in an active state based on the times between transitions from an inactive state to an active state and transitions from an active state to an inactive state that are stored in memory 126.

In a further aspect, the processor 122 of LCCG 40 is configured to assign a plurality of internet protocol addresses each associated with a plurality of LED based illumination devices coupled to the lighting control network. In this manner, from the perspective of a device operating on the building management network, each LED based illumination device coupled to the lighting control network appears directly visible and accessible. However, in reality, all requests for information associated with a particular LED based illumination device are received by LCCG 40 and responses to these requests are generated based, either directly or indirectly, on status information cached in memory 126 of LCCG 40.

In another aspect, a real time clock 44 is maintained on LCCG 40 and the date and time are periodically transmitted to each LED based illumination device on the lighting control network. The real time clock 44 is configured to maintain a current date and time of day, and is periodically synchronized with a time server accessible, for example, through the building management system 400. In addition, the current date and time of day maintained by LCCG 40 are periodically communicated to each LED based illumination device on the lighting control network. In particular, the current date and time of day is communicated to a LED based illumination device in response to receiving a message from the LED based illumination device indicating that the LED based illumination device has transitioned from an inactive state to an active state. In other words, when the LED based illumination device transitions from a powered down state, the current date and time of day are reported to the LED based illumination device so that the device can track its operation in real time.

In some examples, each LED based illumination device on the lighting control network reports the time and date associated with a transition from an active state to an inactive state, such as a shutdown event, or an error event to LCCG 40. LCCG 40 stores this time and date in memory 126. LCCG 40 may report the stored time and date back to each respective LED based illumination device in the lighting control network upon restart or clearing of the error event. In this manner, each LED based illumination device may determine the amount of time it was in an "off" state based on the recalled time and date and the current time and date reported by LCCG 40.

The ability to achieve high speed data communications among LED based illumination devices on the lighting control network including LCCG 40 enables additional, data intensive devices to be added to the LED based illumination devices.

In one example, a LED based illumination device on the lighting control network includes a wireless communications device. In one example, the wireless communications device is a short range radio subsystem that complies with the IEEE 802.15.4 standard. In another example, the wireless communications device is a radio subsystem that complies with the Bluetooth Smart standard. The wireless communications device is configured to transmit or receive an amount of data from a device that is external to the lighting control network (e.g., a sensor such as a camera, an occupancy sensor, an environmental sensor, etc.). Data communicated between this device and the LED based illumination device is communicated to LCCG 40, and ultimately to the building management system 400.

FIG. 4 depicts an environment 141 illuminated by LED based illumination devices 100A-H. In addition, LED based illumination device 100A includes a LCCG 40 to bridge communications between a lighting control network and a building management network. The lighting control network includes LED based illumination devices 100A-H and mobile electronics device 140. The building management network includes LED based illumination device 100A and building management system 400. Mobile electronics device 140 (e.g., mobile phone, tablet computer, etc.) includes a camera module and associated software to identify the presence of LED based illumination devices 100A-H including LCCG 40 within environment 141.

In one example, it may be desirable to group LED based illumination devices 100A-H and control the light emitted from the LED based illumination device 100A-H based on triggering events.

In one aspect, mobile electronics device 140 is configured to generate and communicate instructions to LED based illumination devices 100A-H that define light control rules that govern the response of each of the LED based illumination devices 100A-H.

As depicted in FIG. 1, mobile electronics device 140 broadcasts signal 142. In some embodiments, signal 142 also includes an indication of the identities of each of the LED based illumination devices participating in the group (e.g., LED based illumination devices 100A-H), and at least one lighting control rule. The lighting control rule includes at least one parameter that defines at least a portion of the light control response of each LED based illumination device. By way of non-limiting example, a parameter defining at least a portion of the light control response may include any of a fade-on rate, a target intensity level, a persistence time, and a fade-off rate.

Signal 142 may not directly reach all of the LED based lighting control devices. In these examples, some LED based illumination devices that receive signal 142 rebroadcast signal 142. In this manner, all LED based illumination devices in a group receive the programming information contained in signal 142.

Each of the LED based illumination devices compare their own identities (e.g., MAC address, network ID, etc.) with the target identities included in signal 142. If there is match, the LED based illumination device writes the sensor identity and light control rule(s) to their respective memories (e.g., memory 126 depicted in FIG. 2). In this manner, each LED based illumination device is configured to respond to control communications and respond in accordance with the programmed light control rules. In this manner, a mobile communication device may be employed to flexibly program groups of LED based illumination devices to respond in a synchronized manner.

Although programming information may be communicated to one or more LED based illumination devices by a mobile electronic device, in general, any suitable electronic device (e.g., building management server, networked computer, etc.) may be employed to communicate programming information.

Figure 8:
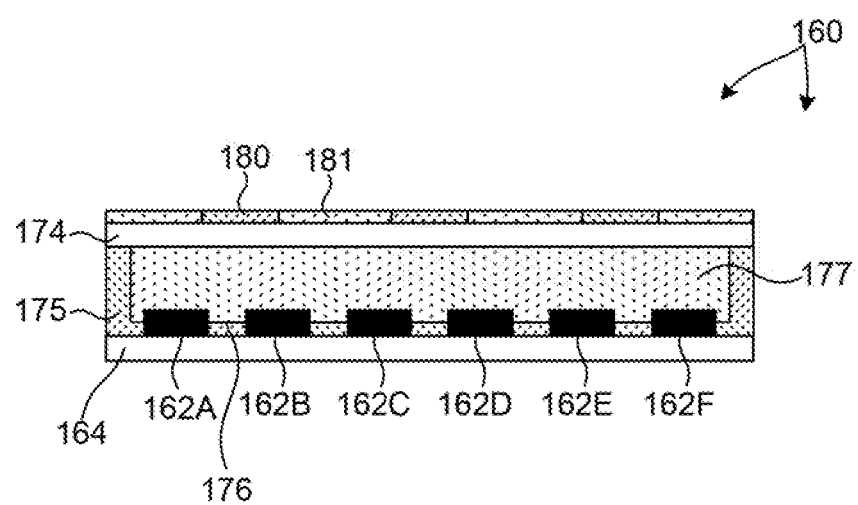
FIG. 8 illustrates a cross-sectional view of an LED based light engine.

FIG. 8 is illustrative of LED based light engine 160 in one embodiment. LED based light engine 160 includes one or more LED die or packaged LEDs and a mounting board to which LED die or packaged LEDs are attached. In addition, LED based light engine 160 includes one or more transmissive elements (e.g., windows or sidewalls) coated or impregnated with one or more wavelength converting materials to achieve light emission at a desired color point.

As illustrated in FIG. 8, LED based light engine 160 includes a number of LEDs 162A-F, sometimes collective referred to as LEDs 162, mounted to mounting board 164 in a chip on board (COB) configuration. The spaces between each LED are filled with a reflective material 176 (e.g., a white silicone material). In addition, a dam of reflective material 175 surrounds the LEDs 162 and supports transmissive element 174, sometimes referred to as a transmissive plate. The space between LEDs 162 and transmissive element 174 is filled with an encapsulating optically translucent material 177 (e.g., silicone) to promote light extraction from LEDs 162 and to separate LEDs 162 from the environment. In the depicted embodiment, the dam of reflective material 175 is both the thermally conductive structure that conducts heat from transmissive plate 174 to LED mounting board 164 and the optically reflective structure that reflects incident light from LEDs 162 toward transmissive plate 174.

LEDs 162 can emit different or the same colors, either by direct emission or by phosphor conversion, e.g., where phosphor layers are applied to the LEDs as part of the LED package. The LED based illumination device 100 may use any combination of colored LEDs 162, such as red, green, blue, ultraviolet, amber, or cyan, or the LEDs 162 may all produce the same color light. Some or all of the LEDs 162 may produce white light. In addition, the LEDs 162 may emit polarized light or non-polarized light and LED based illumination device 100 may use any combination of polarized or non-polarized LEDs. In some embodiments, LEDs 162 emit either blue or UV light because of the efficiency of LEDs emitting in these wavelength ranges. The light emitted from the LED based illumination device 100 has a desired color when LEDs 162 are used in combination with wavelength converting materials on transmissive plate 174, for example. By tuning the chemical and/or physical (such as thickness and concentration) properties of the wavelength converting materials and the geometric properties of the coatings on the surface of transmissive plate 174, specific color properties of light output by LED based illumination device 100 may be specified, e.g., color point, color temperature, and color rendering index (CRI).

For purposes of this patent document, a wavelength converting material is any single chemical compound or mixture of different chemical compounds that performs a color conversion function, e.g., absorbs an amount of light of one peak wavelength, and in response, emits an amount of light at another peak wavelength.

By way of example, phosphors may be chosen from the set denoted by the following chemical formulas: $Y_3Al_5O_{12}$:Ce, (also known as YAG:Ce, or simply YAG) $(Y,Gd)_3Al_5O_{12}$:Ce, CaS:Eu, SrS:Eu, $SrGa_2S_4$:Eu, $Ca_3(Sc,Mg)_2Si_3O_{12}$:Ce, $Ca_3Sc_2Si_3O_{12}$:Ce, $Ca_3Sc_2O_4$:Ce, $Ba_3Si_6O_{12}N_2$:Eu, $(Sr,Ca)AlSiN_3$:Eu, $CaAlSiN_3$:Eu, CaAlSi$(ON)_3$:Eu, $Ba_2SiO_4$:Eu, $Sr_2SiO_4$:Eu, $Ca_2SiO_4$:Eu, $CaSc_2O_4$:Ce, $CaSi_2O_2N_2$:Eu, $SrSi_2O_2N_2$:Eu, $BaSi_2O_2N_2$:Eu, $Ca_5(PO_4)_3Cl$:Eu, $Ba_5(PO_4)_3Cl$:Eu, $Cs_2CaP_2O_7$, $Cs_2SrP_2O_7$, $Lu_3Al_5O_{12}$:Ce, $Ca_8Mg(SiO_4)_4Cl_2$:Eu, $Sr_8Mg(SiO_4)_4Cl_2$:Eu, $La_3Si_6N_{11}$:Ce, $Y_3Ga_5O_{12}$:Ce, $Gd_3Ga_5O_{12}$:Ce, $Tb_3Al_5O_{12}$:Ce, $Tb_3Ga_5O_{12}$:Ce, and $Lu_3Ga_5O_{12}$:Ce.

In one example, the adjustment of color point of the illumination device may be accomplished by adding or removing wavelength converting material from transmissive plate 174. In one embodiment a red emitting phosphor 181 such as an alkaline earth oxy silicon nitride covers a portion of transmissive plate 174, and a yellow emitting phosphor 180 such as a YAG phosphor covers another portion of transmissive plate 174.

In some embodiments, the phosphors are mixed in a suitable solvent medium with a binder and, optionally, a surfactant and a plasticizer. The resulting mixture is deposited by any of spraying, screen printing, blade coating, jetting, or other suitable means. By choosing the shape and height of the transmissive plate 174, and selecting which portions of transmissive plate 174 will be covered with a particular phosphor or not, and by optimization of the layer thickness and concentration of a phosphor layer on the surfaces, the color point of the light emitted from the device can be tuned as desired.

In one example, a single type of wavelength converting material may be patterned on a portion of transmissive plate 174. By way of example, a red emitting phosphor 181 may be patterned on different areas of the transmissive plate 174 and a yellow emitting phosphor 180 may be patterned on other areas of transmissive plate 174. In some examples, the areas may be physically separated from one another. In some other examples, the areas may be adjacent to one another. The coverage and/or concentrations of the phosphors may be varied to produce different color temperatures. It should be understood that the coverage area of the red and/or the concentrations of the red and yellow phosphors will need to vary to produce the desired color temperatures if the light produced by the LEDs 162 varies. The color performance of the LEDs 162, red phosphor and the yellow phosphor may be measured and modified by any of adding or removing phosphor material based on performance so that the final assembled product produces the desired color temperature.

Transmissive plate 174 may be constructed from a suitable optically transmissive material (e.g., sapphire, quartz, alumina, crown glass, polycarbonate, and other plastics). Transmissive plate 174 is spaced above the light emitting surface of LEDs 162 by a clearance distance. In some embodiments, this is desirable to allow clearance for wire bond connections from the LED package submount to the active area of the LED. In some embodiments, a clearance of one millimeter or less is desirable to allow clearance for wire bond connections. In some other embodiments, a clearance of two hundred microns or less is desirable to enhance light extraction from the LEDs 162.

In some other embodiments, the clearance distance may be determined by the size of the LED 162. For example, the size of the LED 162 may be characterized by the length dimension of any side of a single, square shaped active die area. In some other examples, the size of the LED 162 may be characterized by the length dimension of any side of a rectangular shaped active die area. Some LEDs 162 include many active die areas (e.g., LED arrays). In these examples, the size of the LED 162 may be characterized by either the size of any individual die or by the size of the entire array. In some embodiments, the clearance should be less than the size of the LED 162. In some embodiments, the clearance should be less than twenty percent of the size of the LED 162. In some embodiments, the clearance should be less than five percent of the size of the LED. As the clearance is reduced, light extraction efficiency may be improved, but output beam uniformity may also degrade.

In some other embodiments, it is desirable to attach transmissive plate 174 directly to the surface of the LED 162. In this manner, the direct thermal contact between transmissive plate 174 and LEDs 162 promotes heat dissipation from LEDs 162. In some other embodiments, the space between mounting board 164 and transmissive plate 174 may be filled with a solid encapsulate material. By way of example, silicone may be used to fill the space. In some other embodiments, the space may be filled with a fluid to promote heat extraction from LEDs 162.

In the embodiment illustrated in FIG. 8, the surface of patterned transmissive plate 174 facing LEDs 162 is coupled to LEDs 162 by an amount of flexible, optically translucent material 177. By way of non-limiting example, the flexible, optically translucent material 177 may include an adhesive, an optically clear silicone, a silicone loaded with reflective particles (e.g., titanium dioxide ($TiO_2$), zinc oxide (ZnO), and barium sulfate ($BaSO_4$) particles, or a combination of these materials), a silicone loaded with a wavelength converting material (e.g., phosphor particles), a sintered PTFE material, etc. Such material may be applied to couple transmissive plate 174 to LEDs 162 in any of the embodiments described herein.

In some embodiments, multiple, stacked transmissive layers are employed. Each transmissive layer includes different wavelength converting materials. For example, a transmissive layer including a wavelength converting material may be placed over another transmissive layer including a different wavelength converting material. In this manner, the color point of light emitted from LED based illumination device 100 may be tuned by replacing the different transmissive layers independently to achieve a desired color point. In some embodiments, the different transmissive layers may be placed in contact with each other to promote light extraction. In some other embodiments, the different transmissive layers may be separated by a distance to promote cooling of the transmissive layers. For example, airflow may by introduced through the space to cool the transmissive layers.

The mounting board 164 provides electrical connections to the attached LEDs 162 to a power supply (not shown). In one embodiment, the LEDs 162 are packaged LEDs, such as the Luxeon Rebel manufactured by Philips Lumileds Lighting. Other types of packaged LEDs may also be used, such as those manufactured by OSRAM (Ostar package), Luminus Devices (USA), Cree (USA), Nichia (Japan), or Tridonic (Austria). As defined herein, a packaged LED is an assembly of one or more LED die that contains electrical connections, such as wire bond connections or stud bumps, and possibly includes an optical element and thermal, mechanical, and electrical interfaces. The LEDs 162 may include a lens over the LED chips. Alternatively, LEDs without a lens may be used. LEDs without lenses may include protective layers, which may include phosphors. The phosphors can be applied as a dispersion in a binder, or applied as a separate plate. Each LED 162 includes at least one LED chip or die, which may be mounted on a submount. The LED chip typically has a size about 1 mm by 1 mm by 0.5 mm, but these dimensions may vary. In some embodiments, the LEDs 162 may include multiple chips. The multiple chips can emit light similar or different colors, e.g., red, green, and blue. The LEDs 162 may emit polarized light or non-polarized light and LED based illumination device 100 may use any combination of polarized or non-polarized LEDs. In some embodiments, LEDs 162 emit either blue or UV light because of the efficiency of LEDs emitting in these wavelength ranges. In addition, different phosphor layers may be applied on different chips on the same submount. The submount may be ceramic or other appropriate material. The submount typically includes electrical contact pads on a bottom surface that are coupled to contacts on the mounting board 164. Alternatively, electrical bond wires may be used to electrically connect the chips to a mounting board. Along with electrical contact pads, the LEDs 162 may include thermal contact areas on the bottom surface of the submount through which heat generated by the LED chips can be extracted. The thermal contact areas are coupled to heat spreading layers on the mounting board 164. Heat spreading layers may be disposed on any of the top, bottom, or intermediate layers of mounting board 164. Heat spreading layers may be connected by vias that connect any of the top, bottom, and intermediate heat spreading layers.

In some embodiments, the mounting board 164 conducts heat generated by the LEDs 162 to the sides of the board 164 and the bottom of the board 164. In one example, the bottom of mounting board 164 may be thermally coupled to a heat sink, or a lighting fixture and/or other mechanisms to dissipate the heat, such as a fan. In some embodiments, the mounting board 164 conducts heat to a heat sink thermally coupled to the top of the board 164. Mounting board 164 may be an FR4 board, e.g., that is 0.5 mm thick, with relatively thick copper layers, e.g., 30 micrometers to 100 micrometers, on the top and bottom surfaces that serve as thermal contact areas. In other examples, the board 164 may be a metal core printed circuit board (PCB) or a ceramic submount with appropriate electrical connections. Other types of boards may be used, such as those made of alumina (aluminum oxide in ceramic form), or aluminum nitride (also in ceramic form).

Mounting board 164 includes electrical pads to which the electrical pads on the LEDs 162 are connected. The electrical pads are electrically connected by a metal, e.g., copper, trace to a contact, to which a wire, bridge or other external electrical source is connected. In some embodiments, the electrical pads may be vias through the board 164 and the electrical connection is made on the opposite side, i.e., the bottom, of the board. Mounting board 164, as illustrated, is rectangular in dimension. LEDs 162 mounted to mounting board 164 may be arranged in different configurations on rectangular mounting board 164. In one example LEDs 162 are aligned in rows extending in the length dimension and in columns extending in the width dimension of mounting board 164. In another example, LEDs 162 are arranged in a hexagonally closely packed structure. In such an arrangement each LED is equidistant from each of its immediate neighbors. Such an arrangement is desirable to increase the uniformity and efficiency of emitted light.

Figure 9:
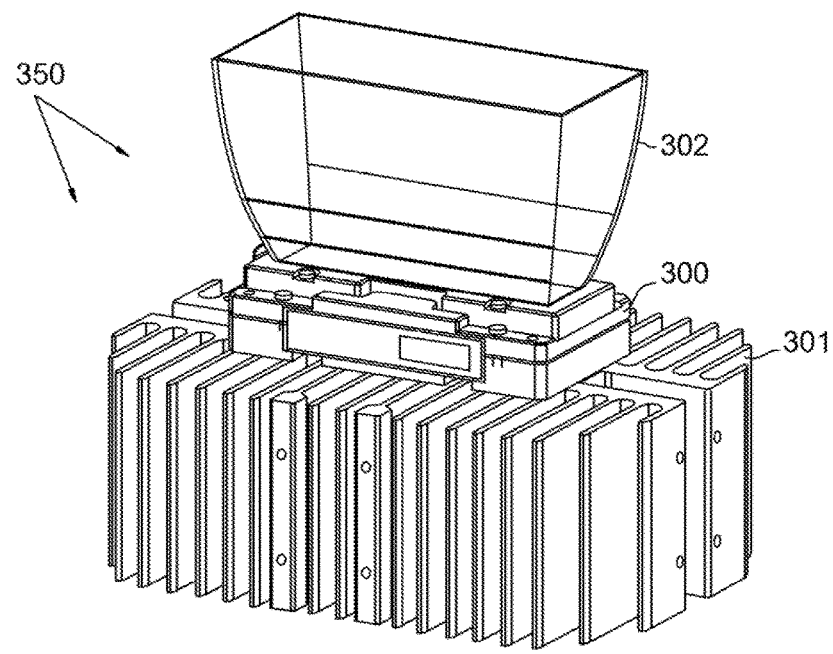
FIG. 9 depicts a perspective view of a luminaire including an LED based illumination device with a rectangular form factor.
Figure 10:
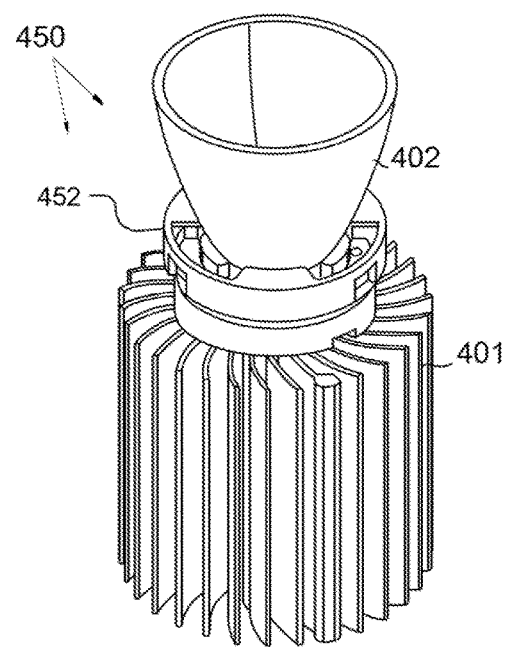
FIG. 10 depicts a perspective view of a luminaire including an LED based illumination device with a circular form factor.
Figure 11:
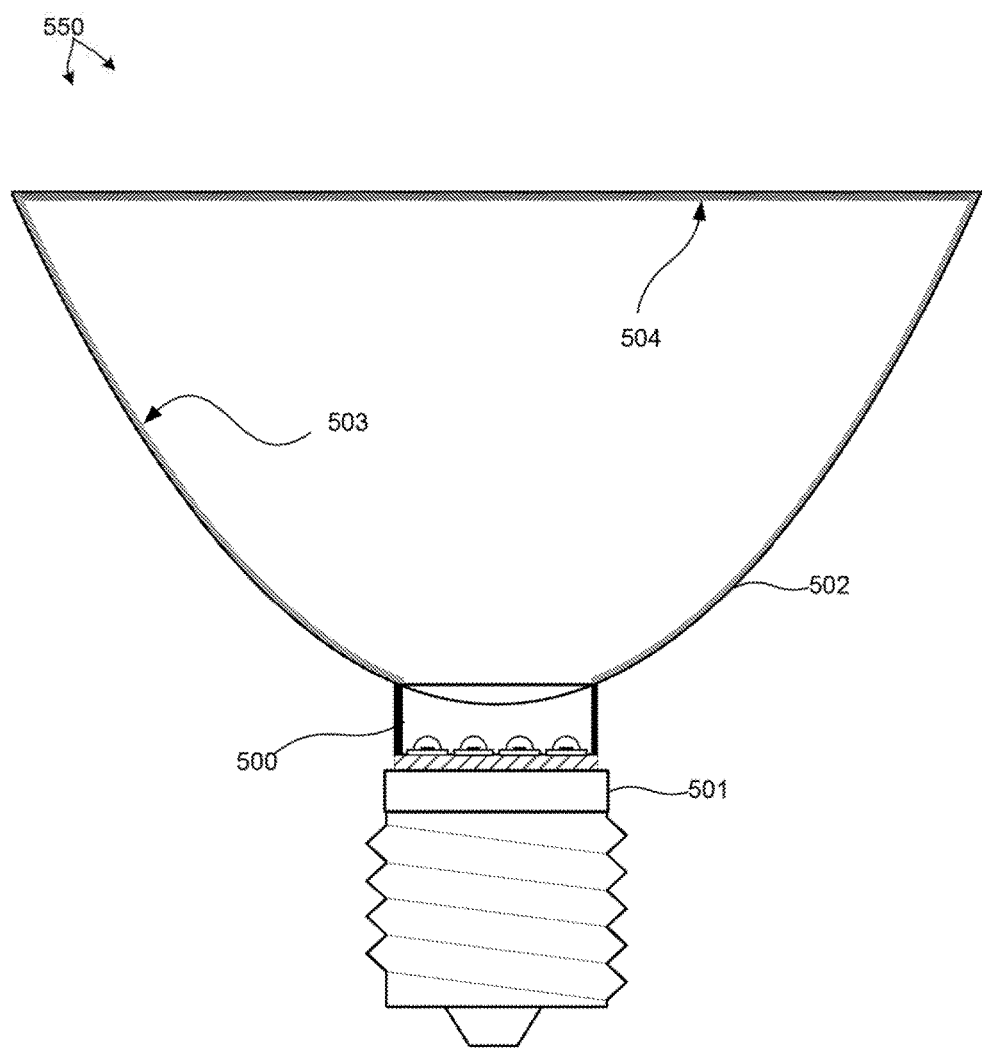
FIG. 11 depicts a side view of a luminaire including an LED based illumination device integrated into a retrofit lamp device.

FIGS. 9, 10, and 11 illustrate three exemplary luminaires. Luminaire 350 illustrated in FIG. 9 includes an illumination module 300 with a rectangular form factor. The luminaire 450 illustrated in FIG. 10 includes an illumination module 452 with a circular form factor. The luminaire 550 illustrated in FIG. 11 includes an illumination module 500 integrated into a retrofit lamp device. These examples are for illustrative purposes. Examples of illumination modules of general polygonal and elliptical shapes may also be contemplated.

Luminaires 350, 450, and 550 include illumination modules 300, 452, and 500, reflectors 302, 402, and 502, and light fixtures 301, 401, and 501, respectively. As depicted, the light fixtures include a heat sink capability, and therefore may be sometimes referred to as a heat sink. However, the light fixtures may include other structural and decorative elements (not shown). The reflectors are mounted to the illumination modules to collimate or deflect light emitted from each illumination module. Reflectors may be made from a thermally conductive material, such as a material that includes aluminum or copper and may be thermally coupled to each illumination module. Heat flows by conduction through the illumination module and the thermally conductive reflector. Heat also flows via thermal convection over the reflector. Reflectors may be compound parabolic concentrators, where the concentrator is constructed of or coated with a highly reflecting material. Optical elements, such as a diffuser or reflector may be removably coupled to an illumination module, e.g., by means of threads, a clamp, a twist-lock mechanism, or other appropriate arrangement. As illustrated in FIG. 11, the reflector 502 may include sidewalls 503 and a window 504 that are optionally coated, e.g., with a wavelength converting material, diffusing material or any other desired material.

As depicted in FIGS. 9, 10, and 11, the illumination module is mounted to a heat sink. The heat sink may be made from a thermally conductive material, such as a material that includes aluminum or copper and may be thermally coupled to an illumination module. Heat flows by conduction through an illumination module and the thermally conductive heat sink. Heat also flows via thermal convection over the heat sink. Each illumination module may be attached to a heat sink by way of screw threads to clamp the illumination module to the heat sink. To facilitate easy removal and replacement, the illumination module may be removably coupled to the heat sink, e.g., by means of a clamp mechanism, a twist-lock mechanism, or other appropriate arrangement. The illumination module includes at least one thermally conductive surface that is thermally coupled to the heat sink, e.g., directly or using thermal grease, thermal tape, thermal pads, or thermal epoxy. For adequate cooling of the LEDs, a thermal contact area of at least 50 square millimeters, but preferably 100 square millimeters should be used per one watt of electrical energy flow into the LEDs on the board. For example, in the case when 20 LEDs are used, a 1000 to 2000 square millimeter heatsink contact area should be used. Using a larger heat sink may permit the LEDs to be driven at higher power, and also allows for different heat sink designs. For example, some designs may exhibit a cooling capacity that is less dependent on the orientation of the heat sink. In addition, fans or other solutions for forced cooling may be used to remove the heat from the device. The bottom heat sink may include an aperture so that electrical connections can be made to the illumination module.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A light control and communications gateway, comprising:
   one or more processors;
   a first radio frequency transceiver configured to receive a first communication signal from a LED based illumination device over a lighting control network, the first communication signal including an indication of an operational status of the LED based illumination device; and
   a non-transitory, computer readable medium storing instructions that when executed by the one or more processors cause the one or more processors to:
     receive the indication of the operational status of the LED based illumination device;
     determine a summary status value associated with the LED based illumination device based on the operational status of the LED based illumination device; and
     communicate the summary status value to a building management system over a building management network.

2. The light control and communications gateway of claim 1, wherein the communicating of the summary status value to the building management system over the building management network involves the first radio frequency transceiver.

3. The light control and communications gateway of claim 1, wherein the communicating of the summary status value to the building management system over the building management network involves a second radio frequency transceiver.

4. The light control and communications gateway of claim 1, the non-transitory, computer readable medium further storing instructions that when executed by the one or more processors enable the one or more processors to:
   receive a request for status information from the building management system over the building management network, and wherein the communicating of the summary status value to the building management system over the building management network is in response to the request for status information.

5. The light control and communications gateway of claim 1, wherein the communicating of the summary status value to the building management system over the building management network is performed without receiving a request for status information from the building management system.

6. The light control and communications gateway of claim 1, wherein the summary status value includes a total amount of time the LED based illumination device has been in an active state.

7. An LED based illumination device comprising:
   an LED based light engine configured to emit an amount of light in response to an electrical current received by the LED based light engine;
   a light control and communications gateway (LCCG) electrically coupled to the LED based light engine, the LCCG comprising:
     a lighting control network interface communicatively coupled to a lighting control network, wherein one or more light control commands for a plurality of LED based illumination devices is received on the lighting control network interface;
     a first radio frequency transceiver configured to receive a first communication signal from a separate LED based illumination device, the first communication signal including an indication of an operational data of the separate LED based illumination device;
     a memory configured to store identification data and operational data associated with the plurality of LED based illumination devices;
     one or more processors; and
     a non-transitory, computer readable medium storing instructions that when executed by the one or more processors cause the one or more processors to:
       receive the indication of the operational data of the separate LED based illumination device;
       determine a summary status value associated with the separate LED based illumination device based on the operational data of the separate LED based illumination device.

8. The LED based illumination device of claim 7, wherein the lighting control network interface comprises a wireless transmitter and a wireless receiver operating in accordance with a wireless communications protocol.

9. The LED based illumination device of claim 8, wherein the wireless communications protocol of the lighting control network interface is a Bluetooth protocol.

10. The LED based illumination device of claim 7, wherein the LCCG further comprises a building management network interface communicatively coupled to a building management network, wherein the summary status value is communicated from the LCCG over the building management network interface to a building management system communicatively coupled to the LCCG over the building management network.

11. The LED based illumination device of claim 10, wherein the building management network interface includes a wireless transmitter and a wireless receiver operating in accordance with a wireless communications protocol.

12. The LED based illumination device of claim 11, wherein the wireless communications protocol of the building management network interface is an IEEE 802.11 communications protocol.

13. The LED based illumination device of claim 11, wherein the lighting control network interface is the same wireless transmitter and wireless receiver as the building management network interface.

14. The LED based illumination device of claim 10, wherein the building management network interface is a wired communications interface operating in accordance with a wired communications protocol.

15. The LED based illumination device of claim 10, wherein the building management network interface is the first radio frequency transceiver.

16. The LED based illumination device of claim 10, the non-transitory, computer readable medium further storing instructions that when executed by the one or more processors enable the one or more processors to:
   receive a request for status information from the building management system over the building management network, and wherein the communicating of the summary status value to the building management system over the building management network is in response to the request for status information.

17. The LED based illumination device of claim 10, wherein the communicating of the summary status value to the building management system over the building management network is performed without receiving a request for status information from the building management system.

18. The LED based illumination device of claim 7, wherein the summary status value includes a total amount of time the separate LED based illumination device has been in an active state.

19. The LED based illumination device of claim 7, further comprising:
   an antenna electrically coupled to the first radio frequency transceiver of the LCCG, wherein the antenna is integrated into any of a housing of the LED based illumination device, an electronic circuit board of the LED based illumination device, and a LED mounting board of the LED based light engine.

20. The LED based illumination device of claim 7, wherein the LCCG further comprises an LED driver configured to receive an amount of electrical power and a light control command from the lighting control network via the lighting control network interface and generate the electrical current in response to the light control command.

* * * * *